US012283796B2

(12) United States Patent
Kurimoto et al.

(10) Patent No.: US 12,283,796 B2
(45) Date of Patent: Apr. 22, 2025

(54) SPARK PLUG

(71) Applicant: Niterra Co., Ltd., Nagoya (JP)

(72) Inventors: Natsuki Kurimoto, Nagoya (JP); Naomichi Miyashita, Nagoya (JP); Naoki Sakade, Nagoya (JP); Kanji Higuchi, Nagoya (JP)

(73) Assignee: NITERRA CO., LTD., Nagoya (JP)

( * ) Notice: Subject to any disclaimer, the term of this patent is extended or adjusted under 35 U.S.C. 154(b) by 0 days.

(21) Appl. No.: 18/407,738

(22) Filed: Jan. 9, 2024

(65) Prior Publication Data

US 2024/0250508 A1 Jul. 25, 2024

(30) Foreign Application Priority Data

Jan. 23, 2023 (JP) ................................ 2023-007907

(51) Int. Cl.
*H01T 13/34* (2006.01)

(52) U.S. Cl.
CPC .................................... *H01T 13/34* (2013.01)

(58) Field of Classification Search
CPC .......... H01T 13/34; H01T 13/32; H01T 13/20
USPC .......................................................... 313/142
See application file for complete search history.

(56) References Cited

U.S. PATENT DOCUMENTS 8,907,552 B2 * 12/2014 Katsuraya ................. F02P 3/01 313/141
2010/0264796 A1 * 10/2010 Musasa ................... H01T 13/39 313/11.5
2016/0365707 A1 12/2016 Yamamura et al.
2017/0292178 A1 * 10/2017 Takasuga ................ C22C 38/44
2019/0237943 A1 * 8/2019 Kaji ........................ H01T 13/39

FOREIGN PATENT DOCUMENTS

JP 2017-004932 A 1/2017

* cited by examiner

*Primary Examiner* — Christopher M Raabe
(74) *Attorney, Agent, or Firm* — RENNER, OTTO BOISSELLE & SKLAR, LLP

(57) ABSTRACT

A spark plug includes a center electrode extending along an axial line, a metal shell holding the center electrode in an insulated manner, and a ground electrode connected to the metal shell by a connection portion. At least one of the center electrode and the ground electrode includes a protrusion. A discharge member joined to the protrusion via a fused portion forms a spark gap between the discharge member and the other one of the electrodes. A recess is formed at a position including the protrusion.

8 Claims, 8 Drawing Sheets

SPARK PLUG

FIELD OF THE INVENTION

The present invention relates to a spark plug in which an electrode includes a protrusion.

An example of a spark plug of the related art in which an electrode includes a protrusion is disclosed in Japanese Unexamined Patent Application Publication No. 2017-4932. The spark plug disclosed in Japanese Unexamined Patent Application Publication No. 2017-4932 includes a discharge member that is joined to a protrusion via a fused portion, and a recess is formed in the fused portion.

In the related art, the volume of a fused portion is reduced by an amount equal to the volume of a recess, and accordingly, the volume of the fused portion is smaller than that in the case of a spark plug in which a fused portion does not have a recess. Thus, there is a concern that a portion formed of a discharge member and the fused portion may experience rapid wear due to spark discharge, potentially leading to a reduction in the durability.

SUMMARY OF THE INVENTION

The present invention has been made to solve the above problem, and it is an object of the present invention to provide a spark plug capable of ensuring its durability while maintaining advantageous effects of increasing the electrical field intensity by a recess and improving the ignitability by suppressing heat conduction.

To achieve the above-mentioned object, a first aspect of the present invention includes a center electrode extending along an axial line, a metal shell holding the center electrode with an insulator interposed therebetween, and a ground electrode connected to the metal shell by a connection portion. The center electrode includes a protrusion and a discharge member, the protrusion protruding from an end of the insulator, and the discharge member being joined to the protrusion via a fused portion and forming a spark gap between the ground electrode and the discharge member. A recess is formed at a position including the protrusion.

A second aspect includes a center electrode extending along an axial line, a metal shell holding the center electrode with an insulator interposed therebetween, and a ground electrode connected to the metal shell by a connection portion. The ground electrode includes a protrusion and a discharge member, the protrusion being formed on an end portion of the ground electrode, and the discharge member being joined to the protrusion via a fused portion and forming a spark gap between the center electrode and the discharge member. A recess is formed at a position including the protrusion.

According to a third aspect, in the first or second aspect, a first sector is a sector with a center located on the axial line when viewed from a direction in which the axial line extends and with a radius equal to a length of a line segment connecting the axial line and a centroid of the connection portion, the sector having a central angle of 90 degrees and line symmetry with respect to the line segment. When a first area is an area obtained by projecting the first sector in the direction in which the axial line extends, the recess is present only outside the first area.

According to a fourth aspect, in the third aspect, a second sector is a sector symmetric to the first sector with respect to a straight line when viewed from the direction in which the axial line extends, the straight line being perpendicular to the line segment and to the axial line and passing through the axial line. When a second area is an area obtained by projecting the second sector in the direction in which the axial line extends, the recess is present only outside the second area.

According to a fifth aspect, in the third aspect, a second sector is a sector symmetric to the first sector with respect to a straight line when viewed from the direction in which the axial line extends, the straight line being perpendicular to the line segment and to the axial line and passing through the axial line. When a second area is an area obtained by projecting the second sector in the direction in which the axial line extends, the recess is present only in the second area.

According to the present invention, a recess is formed at a position including a protrusion, and thus, the volume of a portion formed of a discharge member and a fused portion can be ensured. The amount of wear of the portion, which is formed of the discharge member and the fused portion, due to spark discharge can be ensured, and thus, the durability can be ensured while maintaining advantageous effects of increasing the electrical field intensity by the recess and improving the ignitability by suppressing heat conduction.

DETAILED DESCRIPTION OF THE INVENTION

Figure 1:
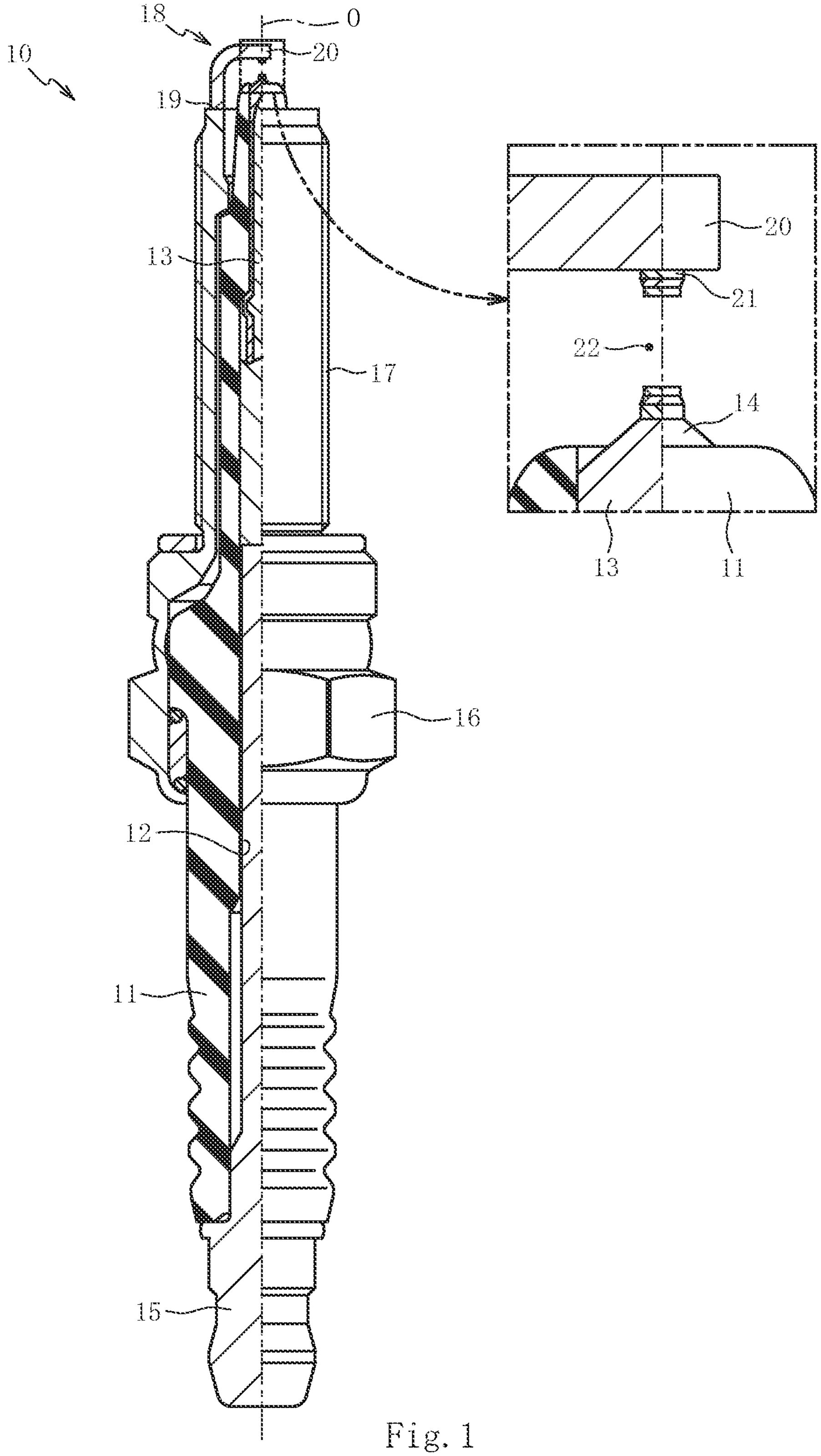
FIG. 1 is a half-sectional view of a spark plug according to a first embodiment.

Preferred embodiments of the present invention will be described below with reference to the accompanying drawings. FIG. 1 is a half-sectional view of a spark plug 10 according to the first embodiment taken along an axial line O. The rear end side of the spark plug 10 corresponds to the lower side as viewed in FIG. 1, and the front end side of the spark plug 10 corresponds to the upper side as viewed in FIG. 1. The same applies to FIG. 2 and FIG. 3.

As illustrated in FIG. 1, the spark plug 10 includes an insulator 11, a center electrode 13 that is held by the insulator 11, a metal shell 16 that is disposed over the outer periphery of the insulator 11, and a ground electrode 18 that is connected to the metal shell 16. The insulator 11 is a member that has a substantially cylindrical shape and that is made of a ceramic, such as alumina, with a favorable mechanical property and a favorable insulating property at high temperature. The insulator 11 has an axial hole 12 that is formed therein and that extends along the axial line O.

The center electrode 13 is a rod-shaped conductor that is disposed in the axial hole 12 of the insulator 11 so as to extend along the axial line O. The center electrode 13 includes a core member containing copper as a main component and a metal member that has a bottomed cylindrical shape and that covers the core member. The core member can be omitted. An example of a metallic material of the center electrode 13 is a Ni-based alloy. The center electrode 13 includes a protrusion 14 that protrudes from the front end of the insulator 11. The protrusion 14 is located on the axial line O.

The center electrode 13 is electrically connected to a metal terminal 15 in the axial hole 12. The metal terminal 15 is a rod-shaped member to which an ignition system (not illustrated) is connected and is made of a metallic material (e.g., low-carbon steel or the like) that has electrical conductivity. The metal terminal 15 is fixed to the rear end side of the insulator 11 in a state where the front end portion thereof is inserted into the axial hole 12 and where the rear end portion thereof extends from the insulator 11.

The metal shell 16 is fixed to the outer periphery of the insulator 11. The metal shell 16 is provided with an external thread 17 that is to be screwed into and connected to an internal thread of a plug hole of an engine (not illustrated). The ground electrode 18 is connected to an end portion of the external thread 17.

The ground electrode 18 is a conductor that extends from the metal shell 16 toward the axial line O. A core member that contains copper as a main component is embedded in the ground electrode 18. The core member can be omitted. In the present embodiment, the ground electrode 18 is a curved rod having a quadrangular cross-section.

The ground electrode 18 includes a connection portion 19 and an end portion 20. The connection portion 19 is connected to the metal shell 16. The end portion 20 faces the protrusion 14 of the center electrode 13. The connection portion 19 is a surface of a portion that is connected to the metal shell 16 by means such as welding or diffusion bonding, the surface being in contact with a weld metal or with a bonding interface, and is a base portion of the ground electrode 18.

The end portion 20 partially extends so as to form a protrusion 21. In the present embodiment, the protrusion 21 is located on the axial line O. A spark gap 22 is formed between the end portion 20 of the ground electrode 18 and the center electrode 13.

Figure 2:
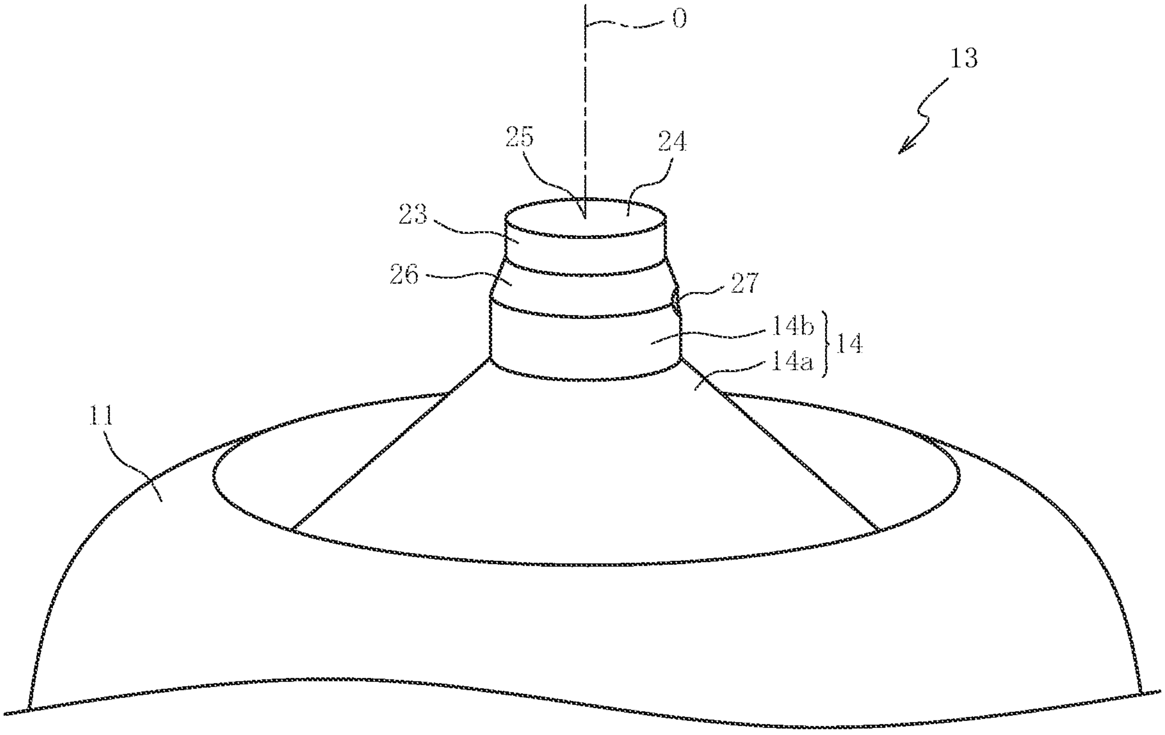
FIG. 2 is a perspective view of a center electrode.

FIG. 2 is a perspective view of the center electrode 13. FIG. 2 illustrates a portion including the protrusion 14 of the center electrode 13 protruding from the front end of the insulator 11. The protrusion 14 is the portion protruding from the front end of the insulator 11. The protrusion 14 includes a first portion 14*a* and a second portion 14*b*. The first portion 14*a* has a conical shape with a decreasing diameter toward the front end side. The second portion 14*b* has a columnar shape and is integrated with the end of the first portion 14*a*. The second portion 14*b* extends from a portion of the first portion 14*a*. The second portion 14*b* of the protrusion 14 is formed by means such as welding or diffusion bonding, or means such as plastic working.

A discharge member 23 is joined to the end (the second portion 14*b*) of the protrusion 14 via a fused portion 26. The fused portion 26 is formed by fusing the protrusion 14 and the discharge member 23. The discharge member 23 is made of an alloy containing the largest amount of a second element that is different from a first element contained in the largest amount in the protrusion 14. The first element contained in the protrusion 14 is, for example, Ni, and the second element contained in the discharge member 23 is, for example, one of noble metals such as Pt, Ir, and Ru.

In the present embodiment, the discharge member 23 has a disc-like shape with a circular end surface 24. In FIG. 2, the axial line O passes through a centroid 25 of the end surface 24 of the discharge member 23. The centroid 25 of the end surface 24 is the geometric center that is calculated by known means when the end surface 24 is considered as a plane figure.

The fused portion 26 is present on the entire periphery between the protrusion 14 and the discharge member 23. The fused portion 26 is formed between the protrusion 14 and the discharge member 23 by, for example, laser beam welding. The fused portion 26 may be formed between the protrusion 14 and the discharge member 23 by resistance welding. Although the length from the edge of the end surface 24 of the discharge member 23 to the fused portion 26 in the direction in which the axial line O extends is not limited, the length may be, for example, 0.25 mm or less.

A recess 27 is formed at a position including the protrusion 14. In the present embodiment, the single recess 27 having an oval shape is formed at the boundary between the second portion 14*b* of the protrusion 14 and the fused portion 26. The recess 27 is formed by cutting work or plastic working at the position including the protrusion 14. Examples of the cutting work include processing using an edged tool or a cutting tool and laser processing.

Figure 3:
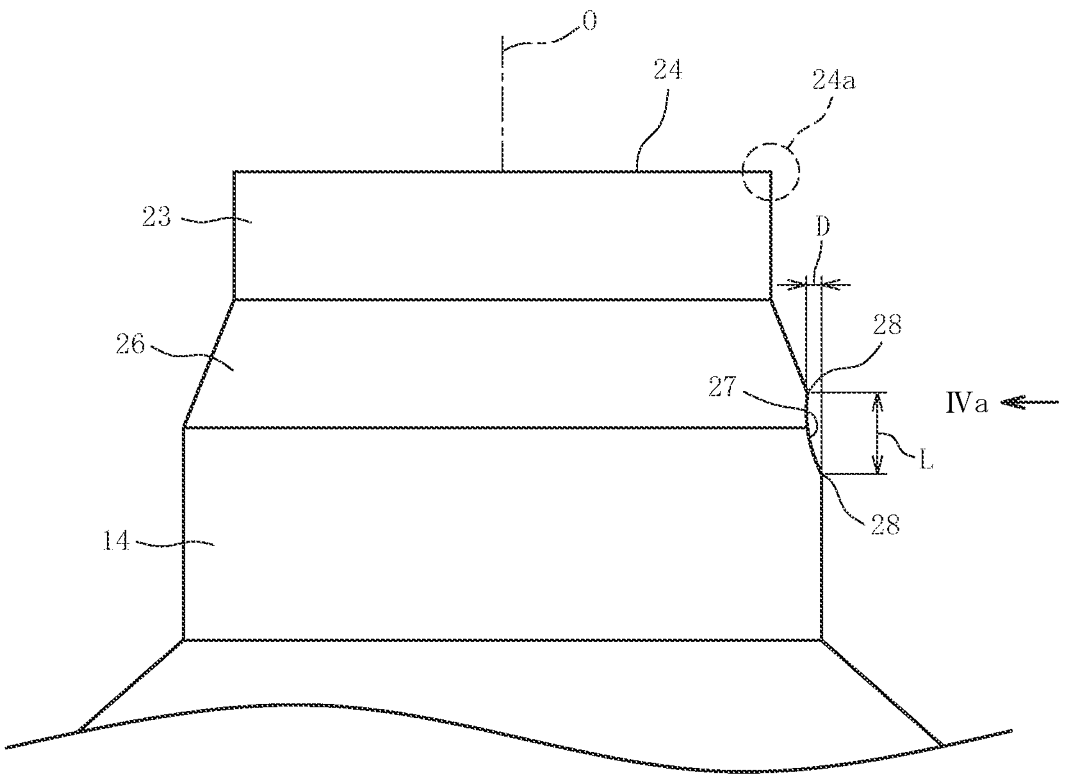
FIG. 3 is a side view of a protrusion.

FIG. 3 is a side view of the protrusion 14. A length L of the recess 27 in the direction in which the axial line O extends, formed at the position including the protrusion 14, is not limited, and the length L may be minimized. By forming the recess 27 at the position including the protrusion 14, edges 28 of the recess 27 are formed at the protrusion 14 and the fused portion 26.

A depth D of the recess 27 is 10 μm or more. The depth D is the distance from the bottom of the recess 27 to an imaginary line of the outer periphery of the protrusion 14 when it is assumed that there is no recess 27. Since the protrusion 14 has the recess 27, the cross-sectional area of the protrusion 14 perpendicular to the axial line O can be reduced by an amount equal to the volume of the recess 27 compared with the case where the protrusion 14 does not have the recess 27. As a result, compared with the case where the protrusion 14 does not have the recess 27, the thermal conductivity from the discharge member 23 to the protrusion 14 is reduced, and the temperature of the discharge member 23 is kept high. Thus, the energy of the flame kernel generated by spark discharge is less likely to be absorbed by the discharge member 23, which in turn facilitates the growth of the flame kernel. This improves the ignitability.

The thermal conductivity from the discharge member 23 to the protrusion 14 can be reduced even by reducing the cross-sectional area of the discharge member 23 and the cross-sectional area of the fused portion 26 by forming the recess 27 in the discharge member 23 and the fused portion 26. However, in the case where the recess 27 is formed in the discharge member 23 and the fused portion 26, the volume of the discharge member 23 and the volume of the fused portion 26 are reduced by an amount equal to the recess 27. Accordingly, the allowable amount of wear of the discharge member 23 and the fused portion 26 due to spark discharge before wear of the protrusion 14 begins after the discharge member 23 and the fused portion 26 have been worn out is reduced, and thus, there is a concern that the durability may be reduced.

In the present embodiment, since the recess 27 is formed at the position including the protrusion 14, the volume of a portion formed of the discharge member 23 and the fused portion 26 can be ensured. The amount of wear of the portion, which is formed of the discharge member 23 and the fused portion 26, due to spark discharge can be ensured, and thus, the durability can be ensured.

Figure 4A:
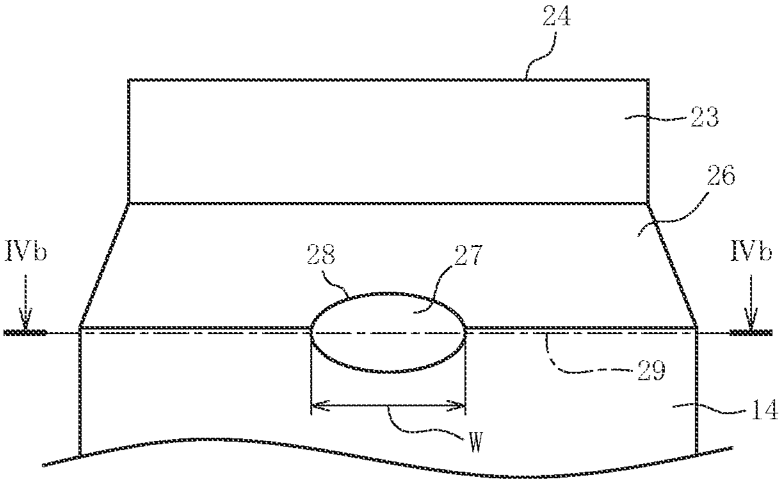
FIG. 4A is a side view of the protrusion.

FIG. 4A is a side view of the protrusion 14. A width W of the recess 27 in the circumferential direction of the protrusion 14 is not limited, and the width W may be minimized. The width W of the recess 27 is the length of the longest line segment among line segments formed by cutting a straight line 29 that is parallel to the end surface 24 of the discharge member 23 by the edges 28 of the recess 27.

Figure 4B:
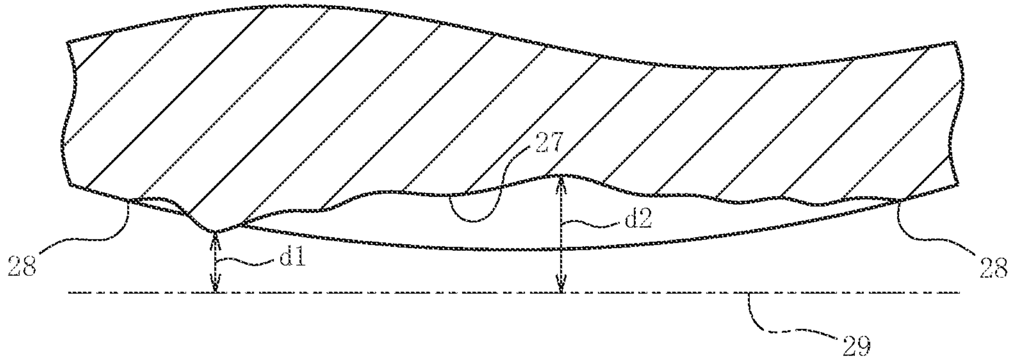
FIG. 4B is a cross-sectional view of the protrusion taken along line IVb-IVb of FIG. 4A.

FIG. 4B is a cross-sectional view of the protrusion 14 taken along line IVb-IVb of FIG. 4A. The straight line 29 and line IVb-IVb are the same. FIG. 4B illustrates only the vicinity of the recess 27 in the cross-section of the protrusion 14. As illustrated in FIG. 4B, when the straight line 29 is set in such a manner that the distance from one of the edges 28 of the recess 27 to the straight line 29 and the distance from the other of the edges 28 of the recess 27 to the straight line 29 are equal to each other, and when the longest distance between the straight line 29 and the recess 27 and the shortest distance between the straight line 29 and the recess 27 are respectively denoted by d2 and d1, it is preferable that the ratio of the difference between d2 and d1 to the width W of the recess 27 ((d2−d1)/W) be less than 0.09. This is to prevent the recess 27 from becoming a sharp cut and to prevent the recess 27 from becoming a starting point of breakage of the protrusion 14.

Figure 5:
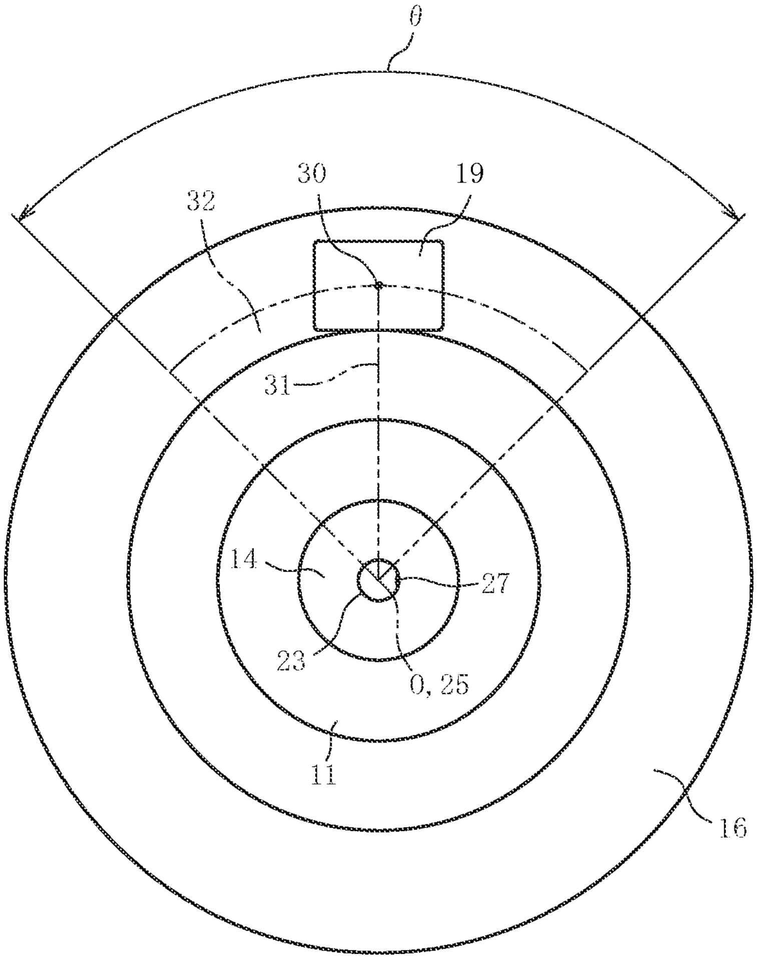
FIG. 5 is a top view of the spark plug.

FIG. 5 is a top view of the spark plug 10 when viewed from the front end side. When the spark plug 10 is viewed from the front end side, the protrusion 14 is hidden behind the ground electrode 18, and even if the ground electrode 18 is removed, the recess 27 provided at the outer periphery of the protrusion 14 may not be seen. Accordingly, in FIG. 5, the ground electrode 18 except for the connection portion 19 is not illustrated, and the recess 27 is exaggeratedly illustrated. The same applies to FIG. 6 and FIG. 8.

When it is assumed that the axial line O passes through the centroid 25 of the discharge member 23, the recess 27 formed in the protrusion 14 is located outside a first area that is obtained by projecting a first sector 32 in the direction in which the axial line O extends. The first area has a columnar shape extending parallel to the axial line O with the first sector 32 as its bottom surface, and thus, when the spark plug 10 is viewed from the front end side, the first area overlaps the first sector 32. Thus, the first area will be denoted by the same reference sign as the first sector 32.

The first sector 32 has its center on the axial line O. The first sector 32 is a sector whose radius is equal to the length of a line segment 31 that connects the axial line O and a centroid 30 of the connection portion 19 and has a central angle θ of 90 degrees including the centroid 30. The first sector 32 is a sector that has line symmetry with respect to the line segment 31. The centroid 30 of the connection portion 19 is the geometric center that is calculated by known means when the connection portion 19 is considered as a plane figure.

According to the spark plug 10, the electrical field intensities of the edges 28 of the recess 27, which is formed at the position including the protrusion 14, are each higher than the electrical field intensity of each of the portions of the protrusion 14 except for the recess 27. As the electrical field intensities of the edges 28 of the recess 27 increase, the electrical field intensity of a portion 24*a* (see FIG. 3) of the end surface 24 of the discharge member 23 also increases, the portion 24*a* being a portion of the end surface 24 that is closest to the recess 27 and being located closer to the front end of the spark plug 10 than the recess 27. Thus, the portion 24*a* is likely to serve as a starting point of spark discharge. In the engine where there is a high intensity flow field, the edges 28 of the recess 27 may sometimes serve as a starting point of spark discharge. The portion 24*a* and the edges 28 of the recess 27 are located outside the first area 32 that is not easily influenced by the ground electrode 18, and thus, the energy of the flame kernel generated by spark discharge between the portion 24*a* or the edges 28 of the recess 27 and the ground electrode 18 is less likely to be absorbed by the ground electrode 18. In addition, an air-fuel mixture that is ignited by the growth of the flame kernel may easily be diffused, so that the ignitability is improved.

Figure 6:
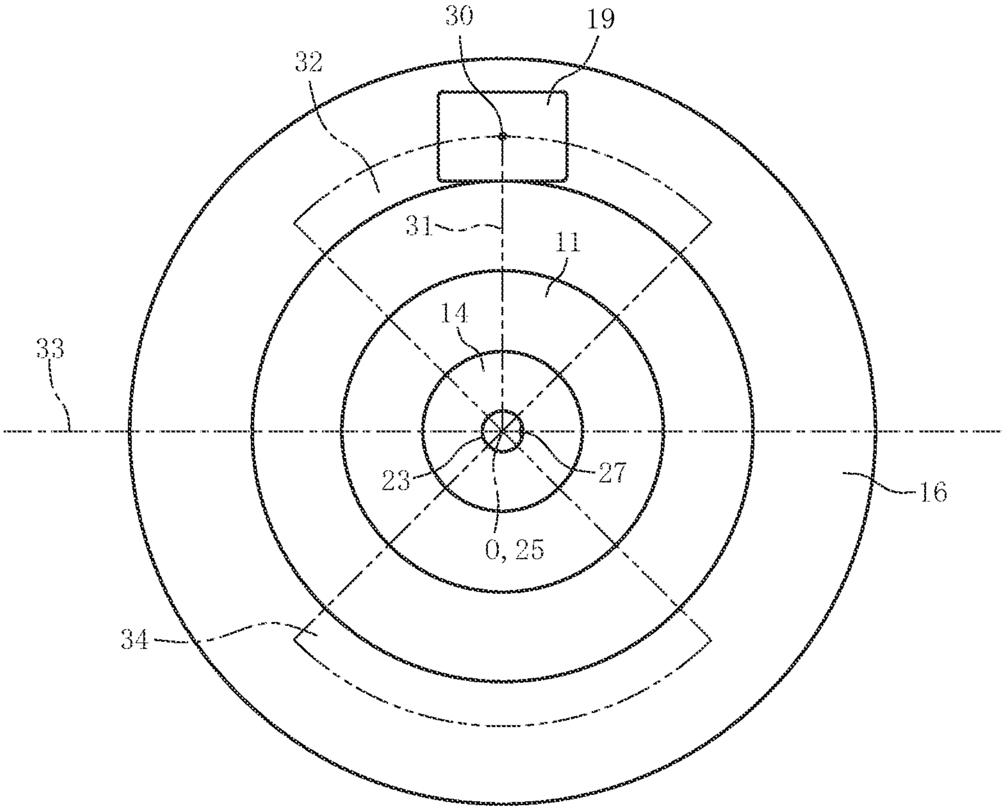
FIG. 6 is another top view of the spark plug.

FIG. 6 is another top view of the spark plug 10. When it is assumed that the axial line O passes through the centroid 25 of the discharge member 23, the recess 27 formed in the protrusion 14 is located outside the first area 32, which is obtained by projecting the first sector 32 in the direction in which the axial line O extends, and is also located outside a second area that is obtained by projecting a second sector 34 in the direction in which the axial line O extends. The second sector 34 and the first sector 32 are symmetric with respect to a straight line 33 that is perpendicular to the line segment 31 and to the axial line O and that passes through the axial line O. The second area has a columnar shape extending parallel to the axial line O with the second sector 34 as its bottom surface, and thus, when the spark plug 10 is viewed from the front end side, the second area overlaps the second sector 34. Thus, the second area will be denoted by the same reference sign as the second sector 34.

The spark plug 10 (see FIG. 1) generates a flame kernel in the spark gap 22 by spark discharge between the center electrode 13 and the ground electrode 18. When the flame kernel grows, ignition and combustion of an air-fuel mixture (a gas) occur. The spark discharge continues until the energy of a coil of the ignition system (not illustrated) is consumed. Extension of a discharge path that connects the discharge member 23 of the center electrode 13 and the end portion 20 of the ground electrode 18 toward a downstream side along with the flow of the gas, leads to an improvement of the ignitability. In an area excluding the first area 32 and the second area 34, the ground electrode 18 is not present in the gas flow (the gas flow parallel to the straight line 33), and thus, the gas may easily flow. In addition, the presence of the portion 24*a* of the discharge member 23, which is likely to serve as the starting point of spark discharge, in the area facilitates extension of the discharge path, resulting in an improvement of the ignitability.

As the discharge path extends, the voltage between the electrodes increases, and a short circuit or re-discharge occurs in the discharge path. When a short circuit or re-discharge occurs in the discharge path, if a discharge occurs between the protrusion 14 and the ground electrode 18, the length by which the discharge path extends toward the downstream side is reduced by an amount equal to the thicknesses of the discharge member 23 and the fused portion 26 and is shorter than that in the case where a discharge occurs between the end surface 24 of the discharge member 23 and the ground electrode 18. However, since the portion 24*a* of the discharge member 23 having a large electrical field intensity is likely to serve as the starting point of spark discharge, the discharge between the protrusion 14 and the ground electrode 18 is less likely to occur, and a sufficiently long downstream extension of the discharge path can be ensured. As a result, the ignitability is improved.

Figure 7:
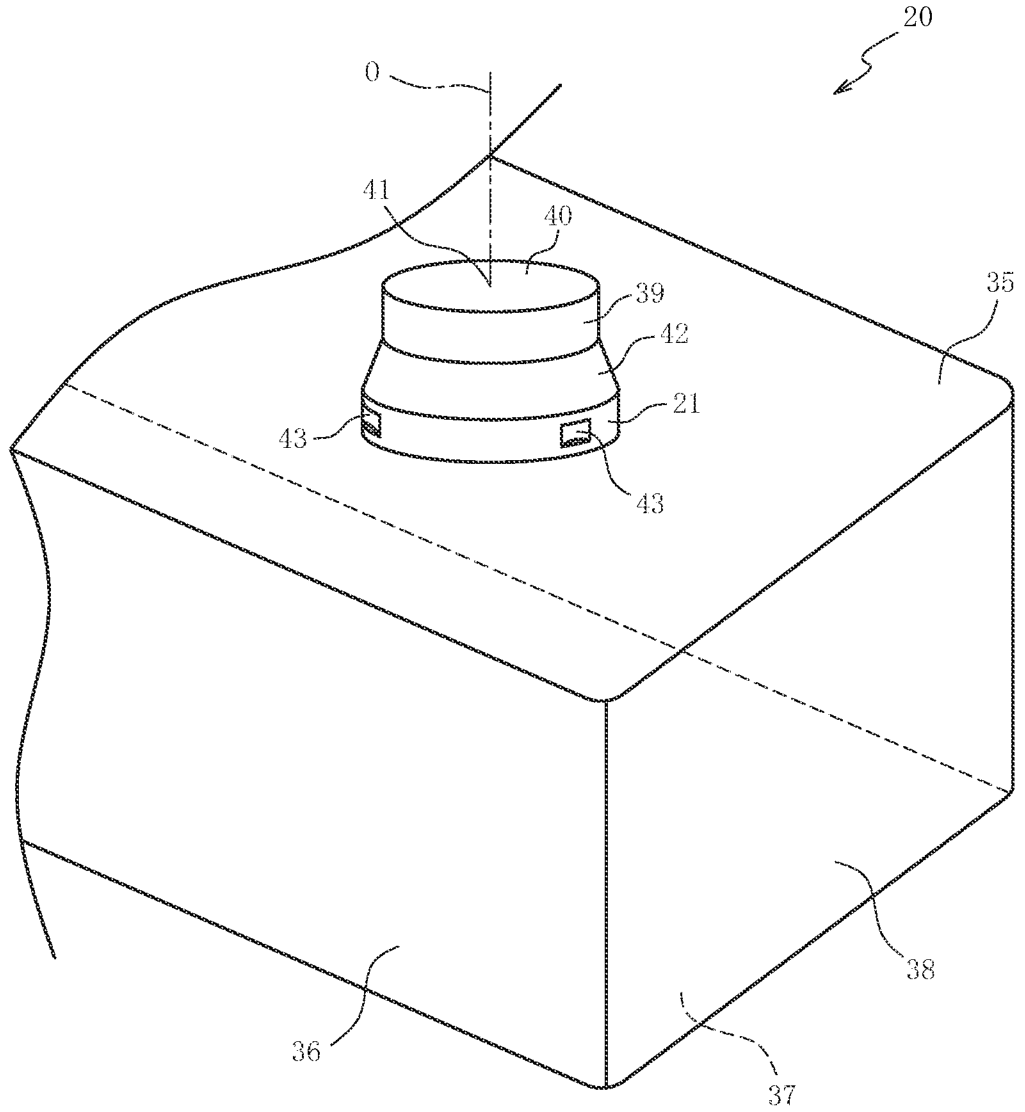
FIG. 7 is a perspective view of a ground electrode.

FIG. 7 is a perspective view of the end portion 20 of the ground electrode 18 (see FIG. 1). The end portion 20 of the ground electrode 18 has a first surface 35 that faces toward the rear end of the spark plug 10, second surfaces 36 that are connected to the two sides of the first surface 35, a third surface 37 that is located on the side opposite to the first surface 35, and an end surface 38 that has a rectangular shape and that is connected to the first surface 35, the second surfaces 36, and the third surface 37. In the present embodiment, the protrusion 21 that has a columnar shape is provided at a position including the axial line O on the first surface 35 of the end portion 20. The protrusion 21 is provided on the end portion 20 by means such as welding or diffusion bonding, or means such as plastic working. In plastic working, for example, a die (not illustrated) is brought into contact with the first surface 35 of the end portion 20, and a punch (not illustrated) is pushed into the third surface 37 so as to cause the protrusion 21 to extend from the first surface 35.

Figure 8:
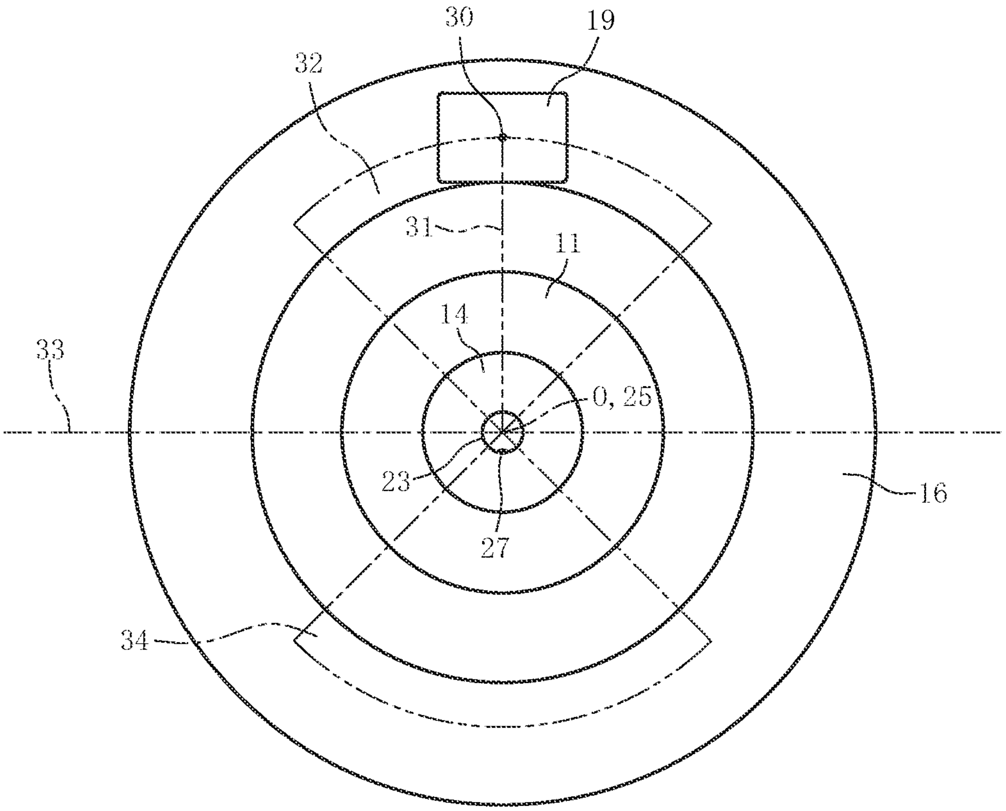
FIG. 8 is a top view of a spark plug according to a second embodiment.

A discharge member 39 is joined to the end of the protrusion 21 via a fused portion 42. The fused portion 42 is formed by fusing the protrusion 21 and the discharge member 39. The discharge member 39 is made of an alloy containing the largest amount of a second element that is different from a first element contained in the largest amount in the protrusion 21. The first element contained in the protrusion 21 is, for example, Ni, and the second element contained in the discharge member 39 is, for example, one of noble metals such as Pt, Ir, and Ru. In the present embodiment, the discharge member 39 has a disc-like shape with a circular end surface 40. In FIG. 8, the axial line O passes through a centroid 41 of the end surface 40 of the discharge member 39. The centroid 41 of the end surface 40 is the geometric center that is calculated by known means when the end surface 40 is considered as a plane figure.

It is not necessary for the centroid 41 of the end surface 40 of the discharge member 39 of the ground electrode 18 and the centroid 25 of the end surface 24 of the discharge member 23 of the center electrode 13 to be located on the same axial line O. The centroid 41 of the end surface 40 of the discharge member 39 and the centroid 25 of the end surface 24 of the discharge member 23 may deviate from the same axial line O within a tolerance range of, for example, about 0.2 mm.

The fused portion 42 is present on the entire periphery between the protrusion 21 and the discharge member 39. The fused portion 42 is formed between the protrusion 21 and the discharge member 39 by, for example, laser beam welding. The fused portion 42 may be formed between the protrusion 21 and the discharge member 39 by resistance welding.

A plurality of recesses 43 are provided at the outer periphery of the protrusion 21. In the present embodiment, the plurality of recesses 43 each of which has a rectangular shape are formed in the protrusion 21. Each of the recesses 43 is formed by cutting work or plastic working at a position including the protrusion 21. Examples of the cutting work include processing using an edged tool or a cutting tool and laser processing.

A length L, a depth D, and a width W of each of the recesses 43, the ratio (d2−d1)/W, and the fact that each of the recesses 43 is located outside the first area 32 and the second area 34 are similar to those of the recess 27 formed in the protrusion 14, and thus, descriptions thereof will be omitted. The recesses 43 formed in the protrusion 21 of the ground electrode 18 can improve the ignitability and the durability in a similar manner to how the recess 27 of the protrusion 14 of the center electrode 13 improves the ignitability and the durability.

The second embodiment will now be described with reference to FIG. 8. In the first embodiment, the case has been described in which the recess 27 formed in the protrusion 14 is located outside the first and second areas 32 and 34. In contrast, in the second embodiment, a case will be described in which the recess 27 formed in the protrusion 14 is located in the second area 34 unlike the first embodiment. In the second embodiment, components that are the same as the components described in the first embodiment are denoted by the same reference signs, and descriptions thereof will be omitted. FIG. 8 is a top view of the spark plug 10 according to the second embodiment when the spark plug 10 is viewed from the front end side.

When it is assumed that the axial line O passes through the centroid 25 of the discharge member 23, the recess 27 formed in the protrusion 14 is located in the second area 34, which is obtained by projecting the second sector 34 in the direction in which the axial line O extends. The portion **24*a* and the edges 28 of the recess 27 are located in the second area 34 that is most unlikely to be influenced by the ground electrode 18, and thus, the energy of the flame kernel generated by spark discharge between the portion 24*a* or the edges 28 of the recess 27 and the ground electrode 18 is further less likely to be absorbed by the ground electrode 18**. In addition, the air-fuel mixture that is ignited by the growth of the flame kernel may further easily be diffused, so that the ignitability is improved.

When at least one of the plurality of recesses 43 formed in the protrusion 21 of the ground electrode 18 is present in the second area 34, a portion that is likely to serve as a starting point of spark discharge is formed in the second area 34, and this contributes to the improvement of the ignitability. When all of the plurality of recesses 43 are present only in the second area 34, the effect of contributing to the improvement of the ignitability is increased, which is preferable.

Although the present invention has been described on the basis of the embodiments, the present invention is in no way limited to the above-described embodiments, and it can be easily inferred that various improvements and modifications can be made within the scope of the present invention.

In the embodiments, the case has been described in which the center electrode 13 and the ground electrode 18 respectively include the protrusion 14 and the protrusion 21 and in which the recess 27 is formed in the protrusion 14 while the recesses 43 are formed in the protrusion 21. However, the present invention is not necessarily limited to this. For example, it is obvious that only one of the protrusions 14 and 21 may have a recess, and that only the center electrode 13 or only the ground electrode 18 may include a protrusion.

In the embodiments, the case has been described in which the recess 27 is formed at the boundary between the protrusion 14 and the fused portion 26 and in which the recesses 43 are formed in the protrusion 21. However, the present invention is not necessarily limited to this. The recess 27 may be formed anywhere as long as it is formed at a position including the protrusion 14, and similarly, each of the recesses 43 may be formed anywhere as long as it is formed at a position including the protrusion 21.

In the embodiments, the case has been described in which the end surface 24 of the discharge member 23 and the end surface 40 of the discharge member 39 each have a circular shape and in which the protrusion 21 has a columnar shape. However, the present invention is not necessarily limited to this. The shape of each of the end surfaces 24 and 40 is suitably set to, for example, a quadrangle or another polygonal shape. Similarly, the shape of the protrusion 21 is suitably set to, for example, the shape of a quadrangular prism, a polygonal prism other than a quadrangular prism, or a truncated cone.

In the embodiments, the case has been described in which the protrusion 14 of the center electrode 13 includes the first portion 14*a* having a conical shape and the second portion 14*b* having a columnar shape integrated with each other and in which the discharge member 23 is joined to the second portion 14*b*. However, the present invention is not necessarily limited to this. It is obvious that a protrusion that only includes the first portion 14*a* may be provided by omitting the formation of the second portion 14*b*, that the discharge member 23 may be joined to the end of the protrusion, and that the recess 27 may be formed in the protrusion.

In the embodiments, the case has been described in which the protrusion 14 of the center electrode 13 includes the conical portion (the first portion 14*a*) with a decreasing diameter toward the front end side. However, the present invention is not necessarily limited to this. Since the protrusion 14 corresponds to the portion extending from the front end of the insulator 11, it is obvious that the protrusion 14 having a columnar shape with a constant diameter may extend from the front end of the insulator 11, and the discharge member 23 may be joined to the end of the protrusion 14.

In the embodiments, the case has been described in which the recess 27 is formed at a single position in the protrusion 14. However, the present invention is not necessarily limited to this. It is obvious that the recess 27 may be formed at a plurality of positions in the protrusion 14. In the case where the recess 27 is formed at a plurality of positions in the protrusion 14, it is only necessary that one of the plurality of recesses 27 be located outside the first area 32 or outside the second area 34 or be located in the second area 34. This is because, if even one of the recesses 27 is present in the area, a portion that is likely to serve as a starting point of spark discharge is formed in the area, and this contributes to the improvement of the ignitability.

In the case where the recess 27 is formed at a plurality of positions of the protrusion 14, it is obvious that all of the plurality of recesses 27 may be located only outside the first area 32, only outside the second area 34, or only in the second area 34. This is because the effect of contributing to the improvement of the ignitability increases when all of the recesses 27 are present in the same area.

In the embodiments, the case has been described in which the recess 27 having an oval shape is formed in the protrusion 14 and in which the recesses 43 each of which has a rectangular shape are formed in the protrusion 21. However, the present invention is not necessarily limited to this. The shape of each of the recesses 27 and 43 is suitably set to, for example, the shape of a circle, a triangle, a rhombus, a pentagon, or a hexagon. It is obvious that a ring-shaped recess may be formed in each of the protrusions 14 and 21 in such a manner as to continuously extend along the whole periphery of the protrusion or that a linear recess may be formed in each of the protrusions 14 and 21 in such a manner as to continuously extend along a portion of the outer periphery of the protrusion.

In the case where a linear recess is formed in each of the protrusions 14 and 21 in such a manner as to continuously extend along a portion of the outer periphery of the protrusion, each of the recesses may be partially located outside the first area 32, outside the second area 34, or in the second area 34. This is because, if even a portion of each of the recesses is present in the area, a portion that is likely to serve as a starting point of spark discharge is formed in the area, and this contributes to the improvement of the ignitability.

In the case where a linear recess is formed in each of the protrusions 14 and 21 in such a manner as to continuously extend along a portion of the outer periphery of the protrusion, it is obvious that each of the recesses may be entirely located only outside the first area 32, only outside the second area 34, or only in the second area 34. This is because the effect of contributing to the improvement of the ignitability increases when the entire recess is present in the same area.

In the embodiments, the case has been described in which the end portion 20 of the ground electrode 18 is located on the axial line O. However, the present invention is not necessarily limited to this. It is obvious that the end portion 20 of the ground electrode 18 may be disposed at a position that does not intersect the axial line O. In other words, for example, the end portion 20 of the ground electrode 18 may be positioned outside the protrusion 14 of the center electrode 13 in the radial direction of the protrusion 14 with a gap formed between the end portion 20 and the protrusion 14.

In the embodiments, the case has been described in which the end portion 20 of the ground electrode 18 is located on the axial line O and in which the protrusion 21 is formed on the first surface 35 of the end portion 20. However, the present invention is not necessarily limited to this. In the case where the end portion 20 of the ground electrode 18 is positioned outside the protrusion 14 of the center electrode 13 in the radial direction of the protrusion 14 with a gap formed between the end portion 20 and the protrusion 14, the protrusion 21 may be formed on the end surface 38 of the end portion 20, and a discharge member may be joined to the protrusion 21. Also in this case, spark discharge occurs between the discharge member of the ground electrode 18 and the center electrode 13.

In the embodiments, the case has been described in which the ground electrode 18 is a curved rod having a quadrangular cross-section. However, the present invention is not necessarily limited to this. Examples of the shape of the ground electrode 18 include a linear shape other than a curve shape. Examples of the cross-sectional shape of the ground electrode 18 include a circular shape, an oval shape, and a semicircular shape other than a quadrangular shape.

In the embodiments, the case has been described in which the connection portion 19 of the ground electrode 18 has a quadrangular shape (FIG. 5, FIG. 6, and FIG. 8) since the ground electrode 18 having a quadrangular cross-section is connected to an end of the metal shell 16 by means such as welding and in which the geometric center when the connection portion 19 is considered as a plane figure is the centroid 30 of the connection portion 19. However, the present invention is not limited to this. Since the shape of the connection portion 19 is suitably set in accordance with, for example, the shape of the ground electrode 18 or the connection state of the ground electrode 18, the centroid of the connection portion 19 is determined accordingly. For example, when a ground electrode having a circular cross section is inserted into a round hole that is formed so as to extend through the external thread 17 of the metal shell 16 in the thickness direction and a ring-shaped fused portion is formed along the whole periphery of the ground electrode by laser beam welding, a connection portion of the ground electrode that is in contact with the fused portion has a cylindrical shape. In this case, the centroid of a column (three-dimensional) having a cylindrical outer peripheral surface is the centroid of the connection portion.

DESCRIPTION OF REFERENCE NUMERALS

10 spark plug
11 insulator
13 center electrode
14,21 protrusion

16 metal shell
18 ground electrode
19 connection portion
20 end portion
22 spark gap
23,39 discharge member
26,42 fused portion
27,43 recess
30 centroid
31 line segment
32 first sector, first area
33 straight line
34 second sector, second area
O axial line
θ central angle

What is claimed is:

1. A spark plug comprising:
a center electrode extending along an axial line;
a metal shell holding the center electrode with an insulator interposed therebetween; and
a ground electrode connected to the metal shell by a connection portion,
wherein the center electrode includes a protrusion, a discharge member, and a fused portion, the protrusion protruding from an end of the insulator, and the discharge member being joined to the protrusion and forming a spark gap between the ground electrode and the discharge member, the fused portion joining the discharge member to the protrusion, and
wherein a recess is formed at a position including the protrusion.

2. The spark plug according to claim 1,
wherein a first sector is a sector with a center located on the axial line when viewed from a direction in which the axial line extends and with a radius equal to a length of a line segment connecting the axial line and a centroid of the connection portion, the sector having a central angle of 90 degrees and line symmetry with respect to the line segment, and
wherein, when a first area is an area obtained by projecting the first sector in the direction in which the axial line extends, the recess is present only outside the first area.

3. The spark plug according to claim 2,
wherein a second sector is a sector symmetric to the first sector with respect to a straight line when viewed from the direction in which the axial line extends, the straight line being perpendicular to the line segment and to the axial line and passing through the axial line, and
wherein, when a second area is an area obtained by projecting the second sector in the direction in which the axial line extends, the recess is present only outside the second area.

4. The spark plug according to claim 2,
wherein a second sector is a sector symmetric to the first sector with respect to a straight line when viewed from the direction in which the axial line extends, the straight line being perpendicular to the line segment and to the axial line and passing through the axial line, and
wherein, when a second area is an area obtained by projecting the second sector in the direction in which the axial line extends, the recess is present only in the second area.

5. A spark plug comprising:
a center electrode extending along an axial line;
a metal shell holding the center electrode with an insulator interposed therebetween; and
a ground electrode connected to the metal shell by a connection portion,
wherein the ground electrode includes a protrusion, a discharge member, and a fused portion, the protrusion being formed on an end portion of the ground electrode, and the discharge member being joined to the protrusion and forming a spark gap between the center electrode and the discharge member, the fused portion joining the discharge member to the protrusion, and
wherein a recess is formed at a position including the protrusion.

6. The spark plug according to claim 5,
wherein a first sector is a sector with a center located on the axial line when viewed from a direction in which the axial line extends and with a radius equal to a length of a line segment connecting the axial line and a centroid of the connection portion, the sector having a central angle of 90 degrees and line symmetry with respect to the line segment, and
wherein, when a first area is an area obtained by projecting the first sector in the direction in which the axial line extends, the recess is present only outside the first area.

7. The spark plug according to claim 6,
wherein a second sector is a sector symmetric to the first sector with respect to a straight line when viewed from the direction in which the axial line extends, the straight line being perpendicular to the line segment and to the axial line and passing through the axial line, and
wherein, when a second area is an area obtained by projecting the second sector in the direction in which the axial line extends, the recess is present only outside the second area.

8. The spark plug according to claim 6,
wherein a second sector is a sector symmetric to the first sector with respect to a straight line when viewed from the direction in which the axial line extends, the straight line being perpendicular to the line segment and to the axial line and passing through the axial line, and
wherein, when a second area is an area obtained by projecting the second sector in the direction in which the axial line extends, the recess is present only in the second area.

* * * * *